Oct. 15, 1968 W. E. BAKER 3,405,520
PRESSURE SEAL
Filed Nov. 3, 1966
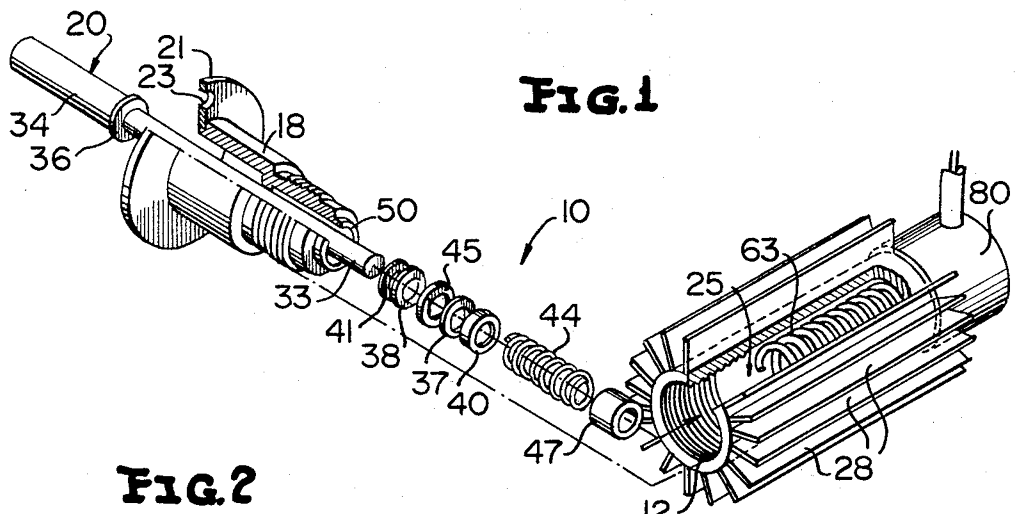
FIG. 2
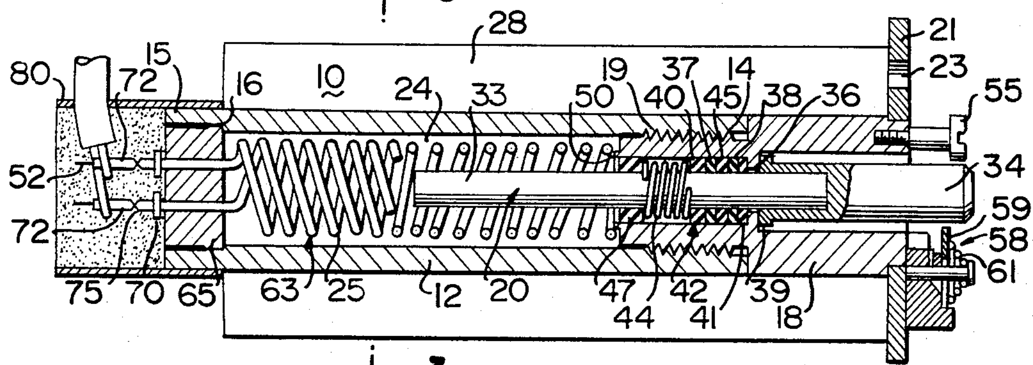
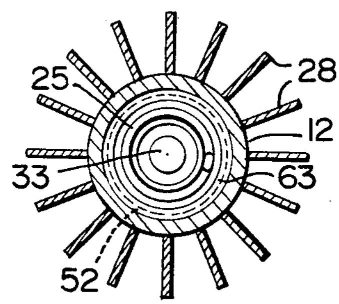
FIG. 3
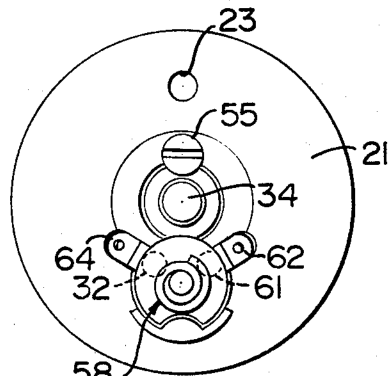
FIG. 4
INVENTOR
WILLIAM E. BAKER
BY Hurvitz & Rose
ATTORNEYS 3,405,520
PRESSURE SEAL William E. Baker, Weston, Mass., assignor to Baker Research & Development Corporation, Waltham, Mass., a corporation of Delaware Filed Nov. 3, 1966, Ser. No. 591,800
3 Claims. (Cl. 60—23)

ABSTRACT OF THE DISCLOSURE

In an electrothermal actuator of the type wherein a reciprocable piston is moved inwardly and outwardly of a chamber in response to heating and cooling of thermally expansive material within the chamber, a multilayer seal is provided to inhibit leakage of the thermally expansive material from the chamber. The centrally disposed layer of the seal is made from an elastomeric material and the layers on either side thereof are made from materials of progressively greater rigidity. The seal is axially loaded so as to radially expand the elastomeric layer against confronting surfaces of the piston and chamber. A heater for the thermally expansible material extends into the chamber and includes an electrical heating element encased by and electrically insulated from a thermally conductive sheath, the sheath being solder sealed to the chamber at the points of extension of the heater into the chamber.

The present invention relates generally to actuating devices and, more particularly, to electrothermal actuators of the type in which a piston is adapted to move outwardly of a container to transmit a force upon an associated device in response to pressures exerted on the piston by the volumetric increase of a thermally expansive material subjected to heating within the container.

Reliable, positive operation of the electrothermal actuators of the aforementioned type over long periods of service depends upon a number of factors, particularly the retention of the expansible-contractible filler material within the confines of the container, and the efficient transfer of heat through the body of filler material from the electric heater. It is precisely the failure to achieve such objectives which has contributed to the marked lack of success of prior art actuators. Since the piston must be permitted to move outwardly and inwardly of the container as the filler material respectively expands and contracts with heating and cooling, it is apparent that the filler is presented with a means of escape from the container along the same route as that along which the piston proceeds. A wide variety of seal designs have been proposed in the prior art as a means for preventing such filler leakage, and to a certain extent, each has provided some limited improvement in actuator operating lifetime.

It is one of the principal objects of the present invention to provide sealing means for electrothermal actuators to improve the operating lifetime by at least an order of magnitude over that available with prior art seals.

Slight consideration of the conflicting requirements to be met by a reliable sealing means will readily indicate the problems encountered in any attempt to improve seal design. For example, the seal should inhibit leakage of the filler material from the container while permitting relative freedom of reciprocal movement by the piston; the frictional drag of the seal on the piston should be extremely low; neither the overall seal nor any of its individual components should mar or damage the polished surface of the piston despite repeated reciprocation over substantial in-service intervals; leakproof sealing of the filler material should be maintained irrespective of slight imperfections in the piston surface; and, seal pressure against piston should exceed the thermal filler pressure.

It is a further object of the present invention to provide a thermal actuator having sealing means exhibiting all of the aforementioned desirable features.

As noted above, a second but equally important consideration in actuator reliability resides in the efficient transfer of heat from the electrical heater to the entire body of filler material, whether the latter be solid, liquid or gaseous. Here again, a number of conflicting factors are presented, e.g. the pressure build-up of the thermally expansible material against the piston must be sufficiently rapid to permit piston stroke against an opposing load in a relatively short time interval, sometimes under five seconds; power consumed in the process of electrically heating and thereby expanding the filler material must be minimal, consistent with performance requirements; power dissipation per unit area of heater surface should be sufficiently low to avoid thermal breakdown of the filler material; surface area of the electrical heater should be relatively large to permit rapid heating of the filler material; and the rate of heat transfer from the electrical heater to the filler material should be maximized to produce a rapid, relatively uniform distribution of heat to all portions of the body of filler material.

It is another principal object of the present invention to provide improved heater means for the filler material of the electrothermal actuator, and more specifically, to provide heater means by which all of the aforementioned requirements pertaining to heating of the expansible material are achieved.

In one prior art form of seal employed to permit movement of the piston outwardly and inwardly of the container while retaining the filler material within the container, the seal consists of four separate components: a non-rigid Teflon wiper having the shape of a washer through the central hole of which the piston extends and clamped about its outer periphery by the two separate opposing sections of the housing; a substantially tubular bearing surrounding the piston and composed of a porous metal saturated with a piston lubricant; a lubricant seal against which the bearing resides to prevent loss of the lubricant via the piston surface as it moves relative to the container; and a metal washer disposed adjacent the lubricant seal and retained by a shoulder along an interior surface of the housing. When the housing is assembled, pressure is exerted against this four-layer seal to deform the surfaces of the wiper and the lubricant seal contacting the piston so as to prevent egress of the expansible material during movement of the piston.

Such a seal severely limits the operating lifetime of the electrothermal actuator for several reasons, principal among which are: the metal-to-metal contact existing between piston and bearing surfaces and between piston and metal washer surfaces; the relatively slow radial flow response of Teflon or other plastic materials to axial pressures; and the tendency of Teflon or other plastics to tear when subjected to high pressures of uneven distribution.

According to one feature of the present invention, the sealing means comprises a multi-layer sandwich including a central washer composed of an elastomeric material having rapid radial flow characteristics under longitudinal or axial pressure; a pair of Teflon washers or other plastic washers exhibiting relatively frictionless and high cold flow properties, disposed against either side of the elastomer washer; and a pair of relatively rigid washers, preferably plastic, each located against a side of a respective one of the Teflon washers remote from the elastomer. The seal is seated at one end, preferably against a shoulder on the surface of a retainer, the piston projecting through a central hole of the multi-layer sandwich in relatively close fitting relationship with the wall of the hole. Loading of the seal is accomplished by a coil spring, confined in compression against the other end of the seal. In addition to exerting a constant longitudinal or axial pressure against the elastomer washer so as to force the hole surface of that washer in high pressure sliding contact with piston surface, thereby barring egress of the thermally expansible filler material from the container or housing while permitting reciprocal movement of the piston via the seal, the spring loading prevents the elastomer from taking a permanent set which would otherwise occur if the elastomer were unloaded for any substantial period of time. Further advantages of this seal arrangement include the provision of progressive layers of increasing rigidity from a central layer having rapidly responsive radial flow characteristics under axial pressure, and the provision of layers having large cold flow characteristics and low coefficient of friction, adjacent the elastomer, to overcome the normal tendency of disruption of the elastomer surface in contact with the piston under conditions of repeated or continuous cycling of the piston.

In accordance with another feature of the invention, the heating means for the filler material is constructed and arranged to overcome the usual disadvantages of prior art heating means employed in electrothermal actuators. Typically, the prior art teaches the use of a coiled heater wire extending into the chamber within which the filler material is disposed, the terminals of the heater wire projecting from one end of the housing via glass or ceramic seals. The disadvantages of such an arrangement include the lack of uniform heating of the filler material; the subjection of the filler to localized "hot spots" at contact points between filler and heater wire, resulting in the possibility of thermal breakdown of the filler; and the tendency of glass or ceramic seals to fracture or crack under conditions of high temperature and pressure. According to the present invention, the heater wire is covered with electrical insulation and is encased in copper tubing which extends as a continuous coil into the chamber housing the filler material through a metal cap disposed at the end of the housing remote from that through which the piston moves. The copper tubing, with the insulated wire sheathed thereby, projects slightly through the holes in the metal cap and silver solder is deposited in the gap between the hole surfaces and the external surfaces of the tubing to provide a secure bond between tubing and cap. The cap, which is provided with a shoulder adapted to abut against a shoulder on the inner surface of the housing, and with a further length of slightly smaller diameter, is bonded to the housing by silver solder deposited in the annular gap between this slightly smaller diameter surface and the inner surface of the housing. The copper tubing is severed and removed from the insulated heater wire a small fraction of an inch beyond the surface of the metal cap from which it projects, the glass or ceramic insulation removed from the heater wire at the severed ends of the copper tubing and a small heat resistant, preferably flexible, washer is pushed over each exposed end of the heater wire. The ends of the heater wire are then inserted into further lengths of copper tubing. Each of these pieces of tubing is pushed against a washer and crimped against the heater wire to provide a solid electrical connection. These pieces of tubing together with the copper tubing sheath provide a continuous heat sink for the entire heater wire except for the very short length encompassed by the insulative washer. Prior to bonding of the metal cap to the inside surface of the tubular housing, the shoulder of the cap is abutted against the aforementioned limiting shoulder on the inside surface of the housing such that the exposed end of the cap, when the cap is bonded to the housing, is recessed relative to the end of the tubular housing. The insulating washer and crimp in the copper tubing lie between the end of the housing and the exposed surface of the cap, and this region or space is then filled with a high temperature potting compound to insulate the copper tubing and to add moderate strength at the crimped portion thereof. In this manner, that portion of the heated surface area to which the thermally expansible filler material is exposed is increased over heater configurations of the prior art, from the area of the heater wire to the outside surface area of the copper tube, while the possibility of thermal breakdown of filler material is substantially decreased owing to the absence of direct contact between the filler material and the heater wires and the decreased wattage dissipation per unit surface area. Moreover, the danger of fracture or cracking of the seal for the heater is substantially eliminated by virtue of the use of a solder bond and the heat resistant flexible washer a slight distance from the solder bond.

Accordingly, further objects of the present invention include the provision of a seal for preventing pressure losses (including loss of vacuum) between the interior and exterior of a pressure chamber via the path taken by a piston adapted to reciprocate in response to pressure variations within the chamber; provision of a piston seal comprising several layers of material which range progressively from a relatively resilient central layer to relatively rigid outer layers, said seal maintained under substantial constant compressive loading in a direction normal to the layers; provision, in a thermal actuator or thermal motor, of means for heating a thermally expansible material without subjecting said material to localized hot spots; provision of a heating means of the aforementioned type wherein a substantially larger thermal surface is presented to the filler material, for more uniform heat transfer to said material, than has heretofore been achieved in thermal actuators; and provision of a heating means of the aforementioned type wherein a leak-proof bond or seal is presented between the heater and the wall of the filler material chamber in such manner as to eliminate the danger of seal fracture.

The above and still further objects, features and attendant advantages of the present invention will become apparent from a consideration of the following detailed description of a preferred embodiment thereof, especially when taken in conjunction with the accompanying drawings, in which:

FIGURE 1 is a perspective exploded view of an exemplary embodiment of the overall actuator;

FIGURE 2 is a sectional view of the assembled actuator of FIGURE 1 taken along a plane containing the axis of symmetry of the actuator;

FIGURE 3 is a sectional view of the actuator taken along the lines 3—3 of FIGURE 2; and FIGURE 4 is a view of the piston-projecting end of the actuator of FIGURE 1.

With reference now to the drawings, the overall actuator 10 comprises a substantially tubular housing or casing 12 having an internally threaded length 14 at one of its ends, and a length of internal surface 15 of slightly greater diameter than the remaining surface of the casing at the other of its ends, thereby forming a shoulder 16.

A cylindrical end member 18 has a mating threaded portion 19 so that it may be screwed into the threaded length 14 of casing 12, and is provided at its other end with a circular flange 21 for mounting the actuator to a panel or other structure (not shown). End member 18 may have an outer diameter substantially equal to that of casing 12, although this is not critical. The screw threads are coated with a conventional thread sealant compound, or are bonded by metal fusion to prevent escape of filler material and pressure losses from the casing.

Casing 12 is preferably composed of steel with a wall thickness of approximately 3/64 inch to provide a low mass container for the thermally expansible filler material 24 disposed within the space or chamber designated by reference numeral 25. The casing may be provided with fins 28, projecting along radial planes from the axis of the casing, fastened to the outer surface of the casing in any convenient and conventional manner. Use of the fins is preferred to permit rapid heat dissipation from the actuator housing during the cooling stage by providing maximum thermal conductivity per unit of mass and by presenting a large surface area to enhance the flow of heat from the housing to the surrounding atmosphere. The fins, however, may be dispensed with, if desired.

End member 18, which may be composed of bronze or other suitable material, is provided with a central hole, aligned with the longitudinal axis of the casing when these two components are fastened together, to permit linear motion of an axially disposed reciprocable piston or shaft 20 therethrough. The piston may be composed of two members, a cylindrical shaft 33 of stainless steel which is press fitted into a cylindrical member 34, of stainless steel, bronze or other suitable material, having an annular flange 36 at its normally internal end. The hole adjacent the exposed end of end member 18 when fastened to the casing, is of sufficient diameter to accommodate flange 36 and abruptly narrows at a radial shoulder 39 against which flange 36 seats as a limitation upon movement of the shaft internally of chamber 25. The remaining portion of the hole through end member 18 is of sufficient diameter to accommodate shaft member 33 and the sealing means for the expansible filler material within the chamber 25.

The seal, generally designated by reference numeral 42, comprises a plurality of flat washer-like layers disposed in contacting relationship along the through hole between flange 39 and a lip 50 of end member 18, each layer or washer having a central hole through which the axially aligned piston 20 extends. The central layer or washer 45 of seal 42 consists of an elastomeric material, preferably buna-N or neoprene, which expands elastically in a radial direction when subjected to axial loading. Hence, elastomeric washer 45, when under longitudinal pressure, is forced against both the surface of shaft member 33 of piston 20 and the internal surface of the smaller diameter hole in end member 18, to prevent egress of filler material from the chamber without significantly impeding the linear motion of the piston. Under conditions of repeated or continuous cycling of the actuator, washer 45 has a tendency to be disrupted along the surface of the hole therein in contact with the piston. In order to eliminate this tendency, which would otherwise lead to pressure leaks, there is provided a pair of Teflon washers 37 and 38, having relatively large cold flow characteristics and low coefficient of friction, in contacting relationship with each side of the elastomer. Further, two relatively rigid plastic washers 40 and 41 abut against respective sides of the Teflon washers remote from the elastomeric layer. Preferably, washers 40 and 41 are composed of a plastic having high compression strength, low cold flow characteristics and low coefficient of friction. In the unloaded condition, all of the washers of which the seal 42 is comprised are of substantially the same inner and outer diameter, and may be of approximately the same thickness, each washer having a relatively close fitting relationship with the piston member 33.

Loading of seal 42, and in particular, of elastomer washer 45, is accomplished by provision of a compression spring 44, the end coils of which are seated against relatively rigid plastic washer 40 and a further rigid plastic washer 47. The latter washer abuts against lip or flange 50 at the interior end of end member 18, the space between the flange or internal shoulder 39 and the flange 50 of the end member being sufficient to accommodate the multi-layer sandwich, the rigid plastic washer 47 and coil spring 44, such that the overall seal is maintained in substantially constant compression, with adequate spring load to produce seal pressures of from 50 to 100 pounds per square inch, for example, transversely on the piston and on the interior surface of the end member against which the elastomer washer resides. Flange 50 is preferably fabricated on the end member in the form of a lip extending longitudinally from the end of member 18 and coextensive with the surface of the hole therein. After insertion of the components of the seal, including multi-layer sandwich, coil spring 44 and plastic washer 47, into the hole, the lip is turned in a plane normal to the axis to provide the flange surface 50, thereby confining the seal in compression (i.e. spring-loaded condition).

The axial pressure on the seal is effective to provide uniform support of elastomer washer 45 by Teflon washers 37 and 38 and to provide uniform support to the Teflon washers by the relatively rigid plastic washers 40 and 41, the elastomer being forced radially against the highly polished surface of piston member 33 and against the surface of the hole in the end member 18.

To assemble the actuator, the metal cap 65 and attached heater coil are inserted into the casing 12 until the flange along the inner end of the cap 65 abuts against a shoulder 16 on the interior surface of the casing. The annular gap between the cap surface and inner casing surface is then filled with silver solder to provide a secure permanent joint so as to prevent leakage of filler or any pressure losses therethrough.

Prior to fastening of the threaded member 18 into the casing, the threads are coated with any suitable thread sealant compound, or after fastening, sealed by metal fusion bonding, to prevent any loss of filler material via space between the threads. Prior to insertion of the piston 20, the chamber is filled through the central hole in end member 18 with a thermally expansible material of any conventional type that may be utilized in thermal actuators or thermal motors, and which may be in solid, liquid, or vapor form. Typical materials, for example, include wax, copper powder-impregnated wax (for improved thermal conductivity), fluorinated liquid FC–43 (Minnesota Mining and Manufacturing Co.), water vapor, or a mixture of water and alcohol. Piston 20 may then be inserted into the hole in the end member as shown in FIGURE 2 so that shaft portion 33 thereof extends through the seal and coil spring, previously confined in the aforementioned manner, into the chamber 25 within the casing. The diameters of flanges 39 and 50 are greater than that of shaft member 33, and since each of the sealing components is non-abrasive and the coil spring does not reside in direct contact with the piston surface, it will be observed that there is eliminated any contact between the polished piston surface and a material which might mar that surface, along the seal area.

A screw 55 is fastened to the exposed end of end member 18 along an axis parallel to the longitudinal axis of the overall actuator, so positioned that the underside of its head projects slightly over the hole through end member 18. Hence, movement of the piston outwardly of the actuator is limited, in the event of a pressure surge, by contact of shoulder 36 of piston member 34 with the underside of the screwhead. A slow make-and-break switch, generally designated by reference numeral 58, is preferably employed to limit the piston stroke by de-energizing the heater when shoulder 36 urges a first metal contact 59 projecting into its path away from second and third metal contacts 32 and 61. Each of the metal contacts 32 and 61 has a respective terminal 62 and 64 connected thereto, the terminals normally connected in series in the heater energizing circuit by leads through hole 23. Upon breaking of bridging electrical contact between contacts 32 and 61 by lifting of plate 59, as the piston reaches the desired stroke limit, the heater energization path is opened and pressure on the piston rapidly reduced to prevent further extensions thereof.

In order to provide heating of the filler material, the actuator includes an electrically energized filament or heater wire 52 which, in accordance with the present invention, is encased in or sheathed by glass or ceramic insulation and then by copper tubing 63 or other tubing of high thermal conductivity. The tubing projects through a metal cap 65, of steel, for example, via holes therein and is securely bonded to the cap by use of silver solder. As will be observed from FIGURES 1 and 2, tubing 63 (and, of course, the heater filament therein) is wound in a continuous coil of diameter greater than the diameter of piston member 33, preferably through the entire length of casing 12, closely adjacent the interior end of the end member 18. The tubing is of small diameter, approximately 1/32 inch, by .020 inch diameter, to accommodate a .0076 inch diameter nichrome heater wire with double glass covered insulation. Tubing 63 is therefore effectively a pressure-tight member having a large surface area and, by virtue of the manner in which it is fastened to metal cap 65, eliminating the disadvantages of conventional fragible seals, such as glass or ceramic. Coiling of tubing 63 within chamber 25 is effective to more evenly distribute the heater surface area throughout the thermal fill.

The copper tubing 63 is preferably of sufficient length to extend slightly beyond the outer end of metal cap 65, with the heater filament exposed beyond that point by removal of insulation. Small electrically-insulating washers 70 are then inserted over the ends of the exposed filaments and further lengths of copper tubing 72 are pushed over each filament end to seat against the insulative washer, and crimped at points 75 to insure retention by the wire. Preferred materials for the insulative washers are asbestos or ceramic. Suitable electrical connections are then made from the heater filaments to the heater energization circuit. The additional length of copper tubing 72 over the end of each heater wire acts as a continuous heat sink for the wire, except for the very short length encompassed by the insulative washer. The insulative washers electrically insulate tubing 72 from sheath 63. They also permit some degree of thermal expansion by eliminating the rigidity of connection which has, in the prior art, enhanced breakage or fracture of connections.

An additional piece of tubing 80 such as aluminum may be pressed over the outer surface of the casing to encompass the further length of copper tubing and the electrical connection to the heater energizing circuit. Alternatively, the casing length may be sufficient to provide a cylindrical space within which the added length of tubing and electrical connections to the heater filament are disposed. In either event, this space or region is filled with a high temperature potting compound, such as an epoxy, of conventional type, to insulate and to add strength to the tubing-washer-filament arrangement.

In operation, the heater wire is electrically energized to effect substantial heat transfer to thermally conductive tube 63, and the latter, having a large surface area, provides substantially uniform heating of the filler material. As a result of this heating of the filler material, it rapidly expands to force the piston outwardly of chamber 25 for actuation of an associated device by contact with the end of piston member 34. Loss of filler material and pressure via the route along which the piston moves is prevented by the seal, the elastomer washer 45 being forced against the piston surface and the hole surface of end member 18, under loading by compression spring 44. Fraying or disruption of the bearing surface of the elastomer is prevented by the Teflon washers positioned at either side thereof. When the electrical heater is de-energized, the filler material rapidly cools and contracts, allowing the piston to return to its initial position under the force applied by the associated device or by an external compression spring (not shown) in contact with the exposed end of the piston.

As previously described, restrictions on the length of the piston stroke are imposed by the switch 58 and by the mechanical stop 55.

Thermal actuators constructed in accordance with the above-described embodiment have been found to operate satisfactorily, without leakage of filler material or pressure losses, for up to several hundred thousand reciprocations of the piston, equivalent to several years of normal use.

While I have disclosed a preferred embodiment of my invention, it will be apparent to those skilled in the art to which the invention pertains that variations in the specific details of construction which have been illustrated and described may be resorted to without departing from the spirit and scope of the invention as defined in the appended claims.

I claim:

1. An electrothermal linear actuator comprising:

a substantial tubular housing having an internally threaded length at one end, a second length having a predetermined internal diameter, and a further length at the other end thereof having a slightly greater internal diameter than said predetermined internal diameter, the transition region between said second and further lengths forming an annular shoulder at the interior wall of said housing;

a cylindrical end member having at one end thereof a threaded external portion adapted to engage said internally threaded length of said housing, said end member having a central hole defined therethrough which is aligned with the longitudinal axis of said housing when said end member and housing are threadedly engaged, said end member having an annular shoulder extending radially into said hole at a location intermediate the ends of said end member, said shoulder in said end member defining an internal diameter which is smaller than the diameter of the remainder of said hole;

thermally expansible filler material disposed within and filling said housing between said end member and said further length of said housing;

a piston member having a first cylindrical section of diameter less than the diameter defined by said shoulder in said end member and a second cylindrical section having a diameter larger than the diameter defined by said shoulder in said end member, said piston member being disposed along the longitudinal axis of said housing wherein said second cylindrical section is disposed in said hole on the side of said shoulder in said end member which is remote from the threaded end of said end member and wherein said first cylindrical section extends into said thermally expansible filler material;

a multilayer seal mounted within the hole in said end member to the side of said shoulder corresponding to the threaded end of said end member, said seal comprising a central layer of elastomeric material, a pair of Teflon layers, one each adjacent a respective side of said central layer, and a pair of outer layers of material having substantially higher compression strength than Teflon, all of said layers being of generally annular configuration having aligned central holes therein, wherein the periphery of each layer abuts the inner surface of said end member and the first cylindrical section of said piston is slidably engaged within said central holes, and wherein one of said outer layers is disposed immediately adjacent said shoulder in said end member;

means for maintaining said multilayer seal in a state of constant compression in a direction parallel to the longitudinal axis of said housing wherein said elastomeric layer is forced radially against the linear surface of said end member;

a metal cap member of generally cylindrical configuration and disposed interiorly of said housing along at least a portion of said further length thereof and in abutting relationship with the shoulder in said housing, the diameter of said cap member being such to provide a snug fit within said further length of said housing, said cap member having a pair of axially oriented apertures defined therethrough;

a heater comprising an electrically energizable heater wire, a thermally conductive sheath surrounding said heater wire about all but the extreme ends of the length of the wire, and electrically insulative material disposed within the sheath to prevent electrical conduction between the wire and the sheath, said heater being formed in the shape of a helical coil disposed within said housing in said thermally expansive material, the ends of said heater extending in substantially parallel relation externally of said housing through respective ones of said apertures in said cap member, each end of said heater having an electrically insulative washer disposed about said heater wire and adjacent respective ends of said sheath, and a pair of electrically conductive terminals surrounding respective ends of said heater wire and disposed adjacent respective ones of said insulative washers;

solder means for filling said apertures in said cap member about said sheath;

further solder means for filling the space in said further length of said housing about said cap member;

a length of tubing forming an extension of said housing on the side of said cap member opposite said thermally expansive filler material; and a high temperature potting compound material disposed within said length of tubing.

2. The electrothermal linear actuator according to claim 1 wherein is further provided means responsive to a predetermined axial displacement of said piston for preventing further displacement of said piston.

3. The electrothermal linear actuator according to claim 1 further comprising a plurality of thermally conductive fins extending radially outward from and along the length of said housing.

References Cited

UNITED STATES PATENTS

| | | | |
|---|---|---|---|
| 3,166,892 | 1/1965 | Sherwood | 60—23 |
| 3,166,894 | 1/1965 | Zmuda et al. | 60—23 |
| 3,193,662 | 7/1965 | Brandt | 219—536 X |
| 3,316,940 | 5/1967 | Gratzmuller | 277—125 X |

FOREIGN PATENTS

| | | |
|---|---|---|
| 856,690 | 12/1960 | Great Britain. |

MARTIN P. SCHWADRON, *Primary Examiner.*

C. B. DORITY, *Assistant Examiner.*